(12) United States Patent
Ishii et al.

(10) Patent No.: US 7,119,776 B2
(45) Date of Patent: Oct. 10, 2006

(54) IMAGE DISPLAY DEVICE

(75) Inventors: Masahiro Ishii, Mobara (JP); Yoshiaki Nakayoshi, Ooamishirasato (JP); Kaori Miyazaki, Mobara (JP); Kazuhiko Yanagawa, Mobara (JP)

(73) Assignee: Hitachi Displays, Ltd., Chiba-ken (JP)

( * ) Notice: Subject to any disclaimer, the term of this patent is extended or adjusted under 35 U.S.C. 154(b) by 352 days.

(21) Appl. No.: 10/434,074

(22) Filed: May 9, 2003

(65) Prior Publication Data

US 2003/0214496 A1 Nov. 20, 2003

(30) Foreign Application Priority Data

May 16, 2002 (JP) ............... 2002-140888

(51) Int. Cl.
*G09G 3/36* (2006.01)
(52) U.S. Cl. ............... 345/92; 345/93; 345/99
(58) Field of Classification Search ............... 345/204, 345/92, 99, 91, 87, 93, 89; 349/39, 41, 139, 349/144, 143; 257/59, 72
See application file for complete search history.

(56) References Cited

U.S. PATENT DOCUMENTS 5,784,042 A * 7/1998 Ono et al. ............... 345/94
6,229,516 B1 5/2001 Kim et al.
6,657,230 B1 * 12/2003 Murade ............... 257/72
6,686,215 B1 * 2/2004 Yamada ............... 438/22
6,887,731 B1 * 5/2005 Nakayama et al. ............ 438/33

FOREIGN PATENT DOCUMENTS

JP 11-183933 12/1997

* cited by examiner

*Primary Examiner*—Richard Hjerpe
*Assistant Examiner*—Abbas Abdulselam
(74) *Attorney, Agent, or Firm*—Reed Smith LLP; Stanley P. Fisher, Esq.; Juan Carlos A. Marquez, Esq.

(57) ABSTRACT

The present invention provides an image display device which can obtain a sufficient writing time of video signals for one line and thus can perform display of high resolution or display of fast animation image. To achieve this object, the image display device is configured such that on a pixel-forming-side surface of a substrate, respective drain signal lines which extend in one direction and are arranged in parallel in another direction which crosses one direction are formed, the respective drain signal lines are separated at approximately center portions thereof, video signals are supplied to the drain signal lines at one side from a first video signal drive circuit and video signals are supplied to the drain signal lines at another side from a second video signal drive circuit, and separated end portions of respective drain signal lines constitute inspection terminals.

6 Claims, 14 Drawing Sheets

Cutting Part

IMAGE DISPLAY DEVICE

BACKGROUND OF THE INVENTION

The present invention relates to an image display device, and more specifically to an image display device such as a liquid crystal display device or the like.

In an active matrix type liquid crystal display device, out of respective substrates which are arranged to face each other in an opposed manner while sandwiching liquid crystal therebetween, on a liquid-crystal-side surface of one substrate, a plurality of gate signal lines which are arranged in parallel and a plurality of drain signal lines which cross these gate signal lines and are arranged in parallel are formed. Each pixel region surrounded by respective signal lines includes a switching element which is operated in response to a scanning signal from the gate signal line and a pixel electrode to which a video signal is supplied from the drain signal line through the switching element.

Due to such a constitution, with respect to respective gate signal lines GL, in response to scanning signals supplied to respective gate signal lines, the gate signal lines are selected sequentially one by one, while video signals are supplied to the respective drain signal lines at the timing of selecting gate signal lines GL.

BRIEF SUMMARY OF THE INVENTION

However, with respect to the liquid crystal display device having such a constitution, along with a growing demand for display with high resolution or display of fast animation image, a shortage of time for writing video signals per one line has been pointed out.

The present invention has been made in view of the above circumstances and it is an object of the present invention to provide an image display device which can ensure a sufficient writing time of video signals for one line thus realizing display with high resolution or display of fast animation image.

To briefly explain typical inventions among inventions disclosed in the specification, they are as follows.

Means 1.

The image display device according to the present invention is, for example, characterized in that, on a pixel-forming-side surface of one substrate, respective drain signal lines which extend in one direction and are arranged in parallel in another direction which crosses one direction are formed, the respective drain signal lines are separated at approximately center portions thereof, video signals are supplied to the drain signal lines at one side from a first video signal drive circuit and video signals are supplied to the drain signal lines at another side from a second video signal drive circuit, separated end portions of respective drain signal lines constitute inspection terminals, and the inspection terminals are configured to extend in the direction orthogonal to the running direction of the drain signal lines.

Means 2.

The image display device according to the present invention is, for example, characterized in that, on a pixel-forming-side surface of one substrate, respective regions which are surrounded by a plurality of gate signal lines which are arranged in parallel and a plurality of drain signal lines which cross the gate signal lines and are arranged in parallel are formed as pixel regions, the respective drain signal lines are separated at approximately center portions thereof, video signals are supplied to the drain signal lines at one side from a first video signal drive circuit and video signals are supplied to the drain signal lines at another side from a second video signal drive circuit, separated end portions of respective drain signal lines constitute inspection terminals, the inspection terminals are configured to extend in the direction orthogonal to the running direction of the drain signal lines, and portions where the inspection terminals are formed are protected from light by light shielding films having the same shape and the same size as light shielding films formed on portions where respective gate signal lines are formed.

Means 3.

The image display device according to the present invention is, for example, characterized in that, on a pixel-forming-side surface of one substrate, a plurality of gate signal lines which are arranged in parallel and a plurality of drain signal lines which cross the gate signal lines and are arranged in parallel are formed, each pixel region which is surrounded by the respective signal lines includes a thin film transistor which is driven in response to a scanning signal from one-side gate signal line and a pixel electrode to which a video signal is supplied from one-side drain signal line through the thin film transistor, the respective drain signal lines are separated at approximately center portions thereof, video signals are supplied to the drain signal lines at one side from a first video signal drive circuit and video signals are supplied to the drain signal lines at another side from a second video signal drive circuit, the thin film transistor which transmits the video signal of one-side drain signal line is operated in response to the scanning signal from the gate signal line arranged at one side with respect to the pixel region to which the video signal is transmitted by the thin film transistor, and the thin film transistor which transmits the video signal of another-side drain signal line is operated in response to the scanning signal from the gate signal line arranged at another side with respect to the pixel region to which the video signal is transmitted by the thin film transistor.

Means 4.

The image display device of the present invention is, on the premise of the constitution of the means 3, characterized in that each thin film transistor includes one electrode which is connected to the drain signal line and another electrode which is connected to the pixel electrode, wherein the channel direction of the thin film transistor set by the arrangement of these respective electrodes is arranged substantially parallel to the gate signal line.

Means 5.

The image display device according to the present invention is, for example, characterized in that, on a pixel-forming-side surface of one substrate, respective drain signal lines which extend in one direction and are arranged in parallel in another direction which crosses one direction are formed, these respective drain signal line shave substantially center portions thereof connected to each other through switching elements, video signals are supplied to one-side drain signal lines from a first video signal drive circuit and video signals are supplied to another-side drain signal lines from a second video signal drive circuit, respective switching elements include an inspection gate signal line in common, and the inspection gate signal line is connected to a voltage generating circuit which supplies an OFF voltage.

Means 6.

The image display device according to the present invention is, for example, characterized in that, on a pixelforming-side surface of one substrate, pixel regions are formed by regions surrounded by a plurality of gate signal lines which are arranged in parallel and a plurality of drain signal lines which are arranged in parallel while crossing these respective gate signal lines, these respective drain signal lines have substantially center portions thereof connected to each other through switching elements, video signals are supplied to one-side drain signal lines from a first video signal drive circuit and video signals are supplied to another-side drain signal lines from a second video signal drive circuit, respective switching elements include an inspection gate signal line in common, and the inspection gate signal line is connected to the respective gate signal lines through diodes which use inspection-gate-signal-line sides thereof as cathodes.

Means 7.

The image display device according to the present invention is, for example, characterized in that, a plurality of drains signal lines which are arranged in parallel are formed on a pixel-forming-side surface of one substrate, these respective drain signal lines have substantially center portions thereof connected to each other through switching elements, video signals are supplied to one-side drain signal lines from a first video signal drive circuit and video signals are supplied to another-side drain signal lines from a second video signal drive circuit, respective switching elements include an inspection gate signal line in common, and the one-side drain signal lines which are arranged at one side with respect to the pixel region and the another-side drain signal lines which are arranged at another side with respect to the pixel region are connected to each other by means of the switching elements.

Means 8.

The image display device according to the present invention is, for example, characterized in that, on a pixel-forming-side surface of one substrate, a plurality of gate signal lines which are arranged in parallel and a plurality of drain signal lines which cross the gate signal lines and are arranged in parallel are formed, each pixel region which is surrounded by the respective signal lines includes a thin film transistor which is driven in response to a scanning signal from the gate signal line and a pixel electrode to which a video signal is supplied from the drain signal line through the thin film transistor, the respective drain signal lines are separated at approximately center portions thereof, video signals are supplied to the drain signal lines at one side from a first video signal drive circuit and video signals are supplied to the drain signal lines at another side from a second video signal drive circuit, a separation portion of each drain signal line includes a capacitive signal line which is arranged substantially parallel to the gate signal line, the pixel electrodes of the respective pixel regions which are arranged close to both sides of the capacitive signal line generate capacitance between the pixel electrodes and the capacitive signal line, and the pixel electrode of another pixel region generates capacitance between the gate signal line which operates the thin film transistor of the pixel region and another gate signal line which is arranged close to the gate signal line while sandwiching the pixel region therebetween.

Means 9.

The image display device according to the present invention is, for example, on the premise of the constitution of the means 8, characterized in that one-side gate signal line and another-side gate signal line have scanning timings thereof displaced from each other by an amount corresponding to one line.

The present invention disclosed in this specification is not limited to the above-mentioned constitutions and various modifications can be made without departing from the technical concept of the present invention.

DETAILED DESCRIPTION OF THE INVENTION

Preferred embodiments of an image display device according to the present invention are explained in detail hereinafter in conjunction with drawings.

Embodiment 1.

(Overall Schematic Constitution)

Figure 2:
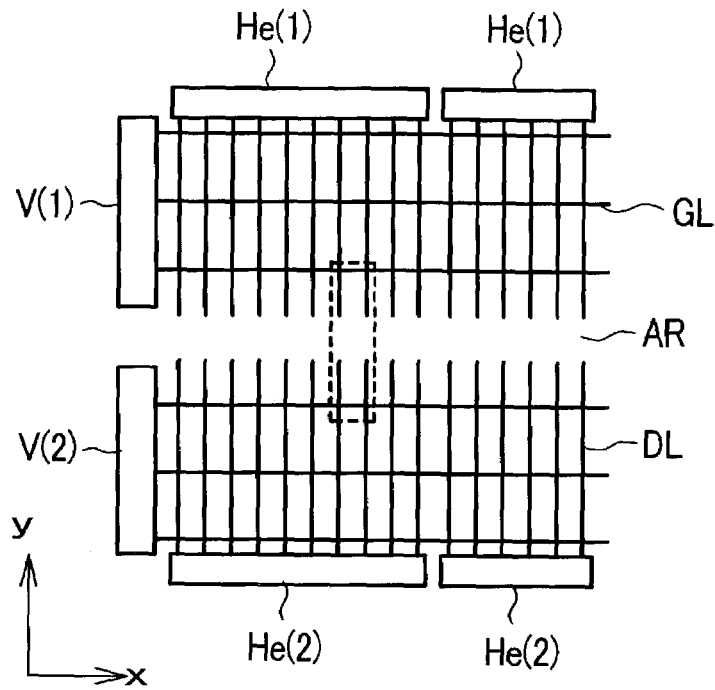
FIG. 2 is a schematic plan view showing one embodiment of the image display device according to the present invention.

FIG. 2 is an overall schematic constitutional view showing one embodiment of a liquid crystal display device of the present invention.

FIG. 2 shows a circuit which is formed on a liquid-crystal-side surface of one transparent substrate SUB1 out of respective transparent substrates which are arranged to face each other in an opposed manner while sandwiching liquid crystal therebetween and is depicted corresponding to an actual geometric arrangement.

In FIG. 2, gate signal lines GL which extend in the x direction and are arranged in parallel in the y direction and drain signal lines DL which extend in the y direction and are arranged in parallel in the x direction are formed.

Each pixel region is formed of a region which is surrounded by a pair of neighboring gate signal lines GL and a pair of neighboring drain signal lines DL. As will be explained in detail later, each pixel region includes a thin film transistor TFT which is operated in response to a scanning signal from one-side gate signal line GL, a pixel electrode PX to which a video signal is supplied from one-side drain signal line DL through the thin film transistor TFT and the like.

Pixels of respective pixel regions having such a constitution are arranged in a matrix array to constitute a liquid crystal display part AR.

Further, the liquid crystal display part AR is divided into upper and lower halves such that the respective drain signal lines DL are physically and electrically divided at a boundary portion.

Respective gate signal lines GL of the liquid crystal display part AR which are positioned at the upper half portion have one ends thereof (for example, left side in the drawing) connected to a scanning signal drive circuit V(1). On the other hand, respective drain signal lines DL have one ends thereof (for example, upper side in the drawing) connected to a video signal drive circuit He(1).

Here, the scanning signal drive circuit V and the video signal drive circuit He are respectively constituted of a plurality of semiconductor circuits, wherein one semiconductor circuit is usually allocated to a plurality of respective signal lines which are arranged to close each other.

In the same manner, respective gate signal lines GL of the liquid crystal display part AR which are positioned at the lower half portion have one ends (for example, left side in the drawing) connected to a scanning signal drive circuit V(2). On the other hand, respective drain signal lines DL have one ends thereof (for example, lower side in the drawing) connected to a video signal drive circuit He(2).

In the liquid crystal display device having such a constitution, the respective gate signal lines GL are sequentially selected one by one in response to the scanning signals supplied from the scanning signal drive circuit V(1) and the scanning signal drive circuit V(2) and the video signals are supplied to the respective drain signal lines DL from the video signal drive circuit He(1) or the video signal drive circuit He(2) at the timing of selecting the gate signal lines GL.

In this manner, the liquid crystal display device can perform the liquid crystal display driving in a state that the length of the drain signal lines DL is shortened and hence, it is possible to ensure the sufficient time for writing video signals with respect to one line.

Accordingly, it is possible to achieve the reliable display of high resolution or the reliable display of fast animation image.

(Constitution of Pixel)

Figure 3A:
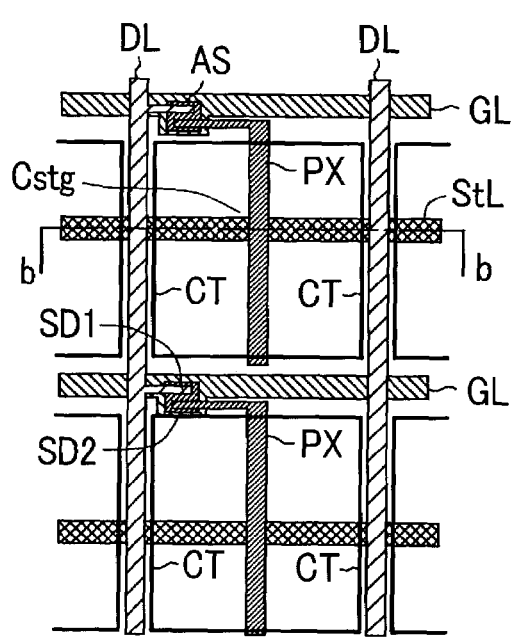
FIG. 3 is a constitutional view showing another embodiment of a pixel of an image display device according to the present invention.
Figure 3B:
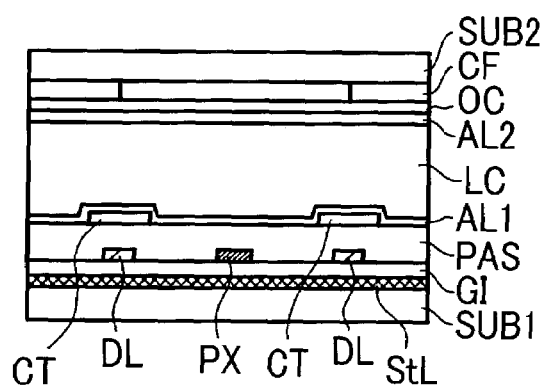

FIG. 3A is a plan view showing one embodiment of a pixel in an upper-side liquid crystal display part AR out of a liquid crystal display part AR. FIG. 3B is a cross-sectional view taken along a line b—b in FIG. 3A.

On a liquid-crystal-side surface of the transparent substrate SUB1, first of all, a pair of gate signal lines GL which extend in the x direction and are arranged in parallel in the y direction are formed.

These gate signal lines GL surround a rectangular region together with a pair of drain signal lines DL which will be explained later and this region constitutes a pixel region.

Further, at the center between the respective gate signal lines GL, a capacitive signal line StL is formed substantially in parallel to the gate signal lines GL. This capacitive signal line StL is formed simultaneously with the formation of the gate signal lines GL, for example.

On a surface of the transparent substrate SUB1 on which the gate signal lines GL and the capacitive signal lines StL are formed, an insulation film GI made of SiN, for example, is formed such that the insulation film GI also covers the gate signal lines GL or the like.

The insulation film GI exhibits a function of an interlayer insulation film with respect to the gate signal lines GL in regions where the drain signal lines DL which will be explained later are formed and exhibits a function of a gate insulation film in regions where the thin film transistors TFT which will be explained later are formed.

Then, on a surface of the insulation film GI, a semiconductor layer AS made of amorphous Si, for example, is formed such that the semiconductor layer AS is overlapped to a portion of the gate signal line GL.

The semiconductor layer AS is a semiconductor layer of the thin film transistor TFT, wherein by forming a drain electrode SD1 and a source electrode SD2 on an upper surface of the semiconductor layer AS, it is possible to constitute an MIS (Metal Insulator Semiconductor) type transistor having an inverse staggered structure which uses a portion of the gate signal line as a gate electrode.

The drain electrode SD1 and the source electrode SD2 are simultaneously formed at the time of forming the drain signal line DL.

That is, the drain signal lines DL which extend in the y direction and are arranged in parallel in the x direction are formed and portions of the drain signal lines DL are extended to upper surfaces of the semiconductor layers AS so as to form the drain electrodes SD1. Further, the source electrodes SD2 are formed away from the drain electrodes SD1 by a length of channels of the thin film transistors TFT.

Further, the source electrodes SD2 are integrally formed with the pixel electrodes PX which are formed inside the pixel regions.

That is, the pixel electrode PX is, for example, constituted of a single electrode which extends in the y direction and is arranged in parallel to the x direction in the pixel region. One end portion of the pixel electrode PX also functions as the source electrode SD2.

In this manner, on the surface of the transparent substrate SUB1 on which the thin film transistors TFT, the drain signal lines DL, the drain electrodes SD1, the source electrodes SD2 and the pixel electrodes PX are formed, a protective film PAS is formed. This protective film PAS is a film which is served for obviating a direct contact of the thin film transistors TFT with the liquid crystal and can prevent the deterioration of characteristics of the thin film transistors TFT.

Here, the protective film PAS may be formed of an organic material layer made of resin or the like or is formed of a sequentially laminated body consisting of an inorganic material layer made of SiN or the like and an organic material layer made of resin or the like. The reason that at least the organic material layer is used as the protective film PAS is to reduce a dielectric constant of the protective film per se.

Counter electrodes CT are formed on an upper surface of the protective film PAS. The counter electrodes CT are, in the same manner as the previously-mentioned pixel electrodes PX, constituted of a group of a plurality of (two in the drawing) electrodes which extend in the y direction and are arranged in parallel in the x direction. Further, these respective electrodes are positioned such that the electrodes sandwich the pixel electrode PX therebetween when viewed in a plan.

That is, the counter electrodes CT and the pixel electrodes PX are arranged at an equal interval in order of the counter electrode, the pixel electrode, the counter electrode from one-side drain signal line to another-side drain signal line.

Here, the counter electrodes CT which are positioned at both sides of the pixel region are formed such that portions thereof are overlapped to the drain signal lines DL and, at the same time, are formed in common with corresponding counter electrodes CT of the neighboring pixel regions.

That is, the counter electrode CT is overlapped to the drain signal line DL such that their center axes are substantially aligned with each other and a width of the counter electrode CT is set larger than a width of the drain signal line DL. The counter electrode CT arranged at the left side with respect to the drain signal line DL constitutes one of respective counter electrodes CT of the left-side pixel region, while the counter electrode CT arranged at the right side with respect to the drain signal line DL constitutes one of respective counter electrodes CT of the right-side pixel region.

In this manner, by forming the counter electrode CT having a larger width than the drain signal line DL over the drain signal line DL, it is possible to obtain an advantageous effect that lines of electric force from the drain signal line DL are prevented from terminating at the counter electrode CT or terminating at the pixel electrode PX. When the lines of electric force from the drain signal line DL terminates at the pixel electrode PX, this gives rise to noises.

The respective counter electrodes CT which constitute a group of electrodes are integrally formed with counter voltage signal lines CL which are formed such that the counter voltage signal lines CL sufficiently cover the gate signal lines GL and are made of the same material as the counter electrodes CT, wherein the reference voltage is supplied through these counter voltage signal lines CL.

Here, the pixel electrode PX is formed such that a portion thereof is overlapped to the capacitive signal line StL or the counter voltage signal line CL. Due to such a constitution, a capacitive element Cstg which uses the protective film PAS as a dielectric film is formed between the pixel electrode PX and the counter voltage signal line CL.

The capacitive element Cstg is configured to have a function of storing video signals supplied to the pixel electrode PX for a relatively long time, for example.

Then, on the upper surface of the transparent substrate SUB1 on which the counter electrodes CT are formed in this manner, an orientation film AL1 is formed such that the orientation film AL1 also covers the counter electrodes CT. This orientation film AL1 is a film which is directly brought into contact with the liquid crystal and the initial orientation direction of molecules of the liquid crystal is determined based on rubbing formed on the surface of the orientation film AL1.

On a liquid-crystal-side surface of the transparent substrate SUB2 which is arranged to face the transparent substrate SUB1 having such a constitution by way of the liquid crystal LC, color filters CF, a leveling film OC and an orientation film AL2 are sequentially formed.

(Constitution of Pixel in the Vicinity of Separation Portion of Drain Signal Lines)

Figure 1A:
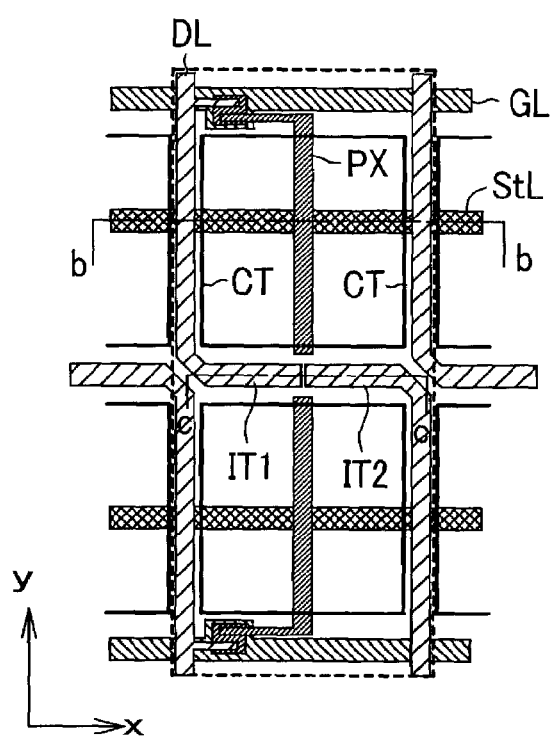
FIG. 1 is a constitutional view showing one embodiment of a pixel of an image display device according to the present invention.
Figure 1B:
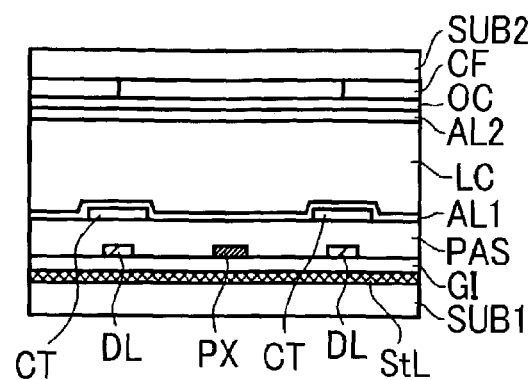
Figure 1C:
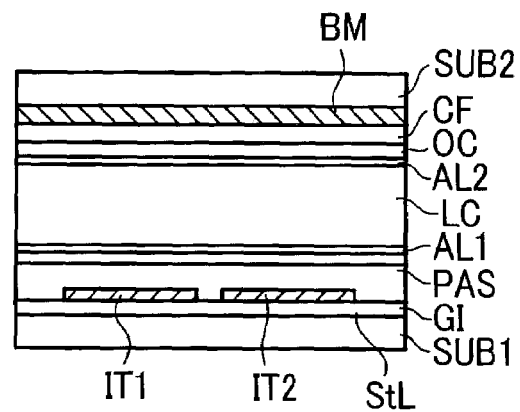

FIG. 1A is a plan view showing one embodiment of the pixel in the vicinity of the separation portion of the drain signal lines DL and corresponds to a portion framed by a dotted line in FIG. 2. Further, FIG. 1B is a cross-sectional view taken along a line b—b in FIG. 1A and FIG. 1C is a cross-sectional view taken along a line c—c in FIG. 1A.

Here, using the separation portion of respective drain signal lines DL as a boundary, the pixel arranged above the separation portion is driven by the thin film transistor TFT which is operated in response to a scanning signal from the gate signal line GL which is arranged in a spaced-apart manner to the upper side from the separation portion by one pixel portion. On the other hand, the pixel arranged below the separation portion is driven by the thin film transistor TFT which is operated in response to a scanning signal from the gate signal line GL which is arranged in a spaced-apart manner to the lower side from the separation portion by one pixel portion.

Due to such an arrangement, as will be explained later, it is possible to set the space at the separation portion of the respective drain signal lines DL to a value equal to the space between respective pixels (respective pixels arranged in the y direction).

Then, in the separation portion of respective drain signal lines DL, an end portion of the drain signal line DL which is positioned at the left side of the upper-side pixel is formed such that the end portion is extended while being bent to the right side in the x direction, while an end portion of the drain signal line DL which is positioned at the right side of the lower-side pixel is formed such that the end portion is extended while being bent to the left side in the x direction.

That is, the extension portions of the respective drain signal lines DL are arranged linearly in the x direction in a discontinuous manner.

In this case, the extension portions of the respective drain signal lines DL function as inspection terminals IT1, IT2 respectively. That is, using the separation portion of respective drain signal lines DL as the boundary, the respective drain signal lines DL in the upper-side liquid crystal display part AR also include other inspection terminals at the video signal drive circuit He(1) side and it is possible to perform an inspection of disconnection or the like, for example, between the inspection terminal and the above-mentioned inspection terminal IT1.

In the same manner, using the separation portion of respective drain signal lines DL as the boundary, the respective drain signal lines DL in the lower-side liquid crystal display part AR also include other inspection terminals at the video signal drive circuit He(2) side and it is possible to perform an inspection of disconnection or the like, for example, between the inspection terminal and the above-mentioned inspection terminal IT2.

Here, over the inspection terminals IT1, IT2 of the respective drain signal lines DL, counter voltage signal lines CL are formed by way of a protective film PAS in the same manner as regions where the gate signal lines GL are formed.

Accordingly, it is possible to prevent leaking of an electric field from the inspection terminals IT1, IT2 by the counter voltage signal lines CL. Further, since an electric field generated between the inspection terminals IT1, IT2 due to the potential difference between the inspection terminals IT1, IT2 is absorbed at the counter voltage signal line CL side, it is possible to prevent a defective display which is caused by the disturbance of the arrangement of liquid crystal attributed to the leaking electric field from the inspection terminals IT1, IT2.

Embodiment 2.

Figure 4:
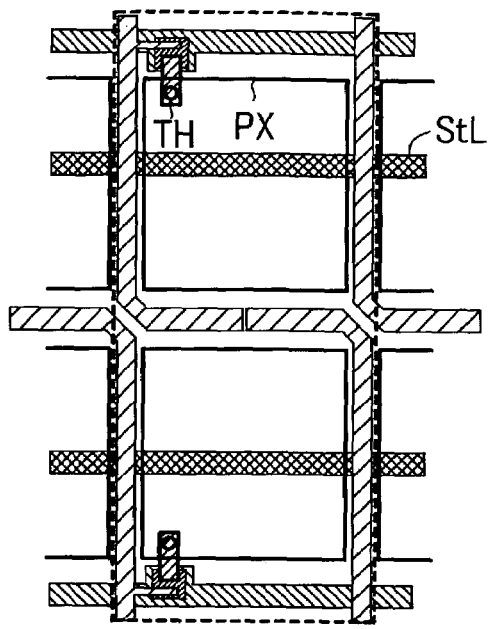
FIG. 4 is a plan view showing another embodiment of the image display device according to the present invention.

FIG. 4 is a constitutional view showing another embodiment of the liquid crystal display device according to the present invention and corresponds to FIG. 1A.

The constitution which makes this embodiment different from the embodiment shown in FIG. 1A lies in that the liquid crystal display device to which the present invention is applicable may be a pixel of so-called vertical electric field type.

The pixel electrode PX adopting this system is formed of a light transmissive conductive film made of, for example, ITO (Indium Tin Oxide), ITZO (Indium Tin Zinc Oxide), IZO (Indium Zinc Oxide), $SNO_2$ (Tin Oxide), $IN_2O_3$ (Indium) or the like and is formed to cover a major portion of the pixel region.

With respect to the counter electrode CT which generates an electric field between the counter electrode CT and the pixel electrode PX, on a liquid-crystal-side surface of another transparent substrate which is arranged to face the transparent substrate SUB1, a light transmissive conductive film which is formed in common over respective pixel regions and is made of the above-mentioned ITO (Indium Tin Oxide) or the like is formed.

Here, in this embodiment, since the pixel electrode PX is formed on an upper surface of the protective film PAS, the pixel electrode PX is electrically connected with the source electrode SD2 of the thin film transistor TFT via a through hole TH formed in the protective film PAS.

Embodiment 3.

Figure 5A:
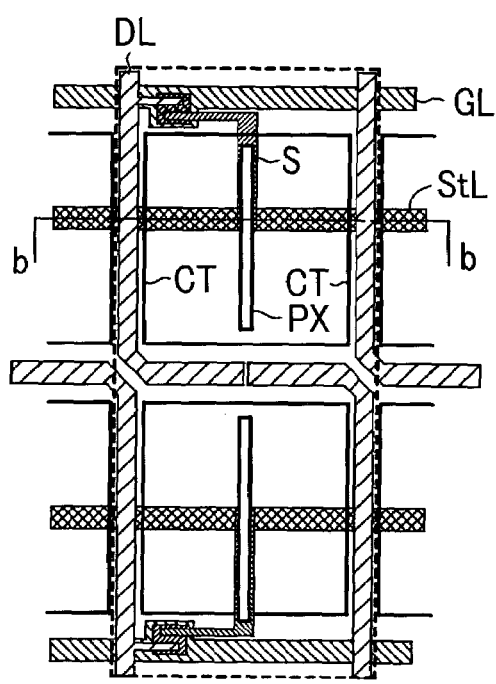
FIG. 5 is a constitutional view showing another embodiment of a pixel of an image display device according to the present invention.
Figure 5B:
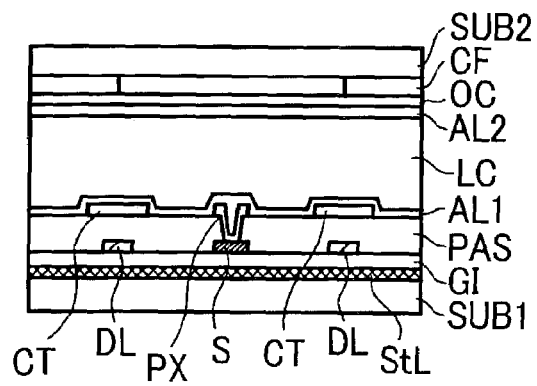

FIG. 5A is a constitutional view showing another embodiment of the liquid crystal display device according to the present invention and corresponds to FIG. 1A. Further, FIG. 5B is a cross-sectional view taken along a line b—b in FIG. 5A.

The constitution which makes this embodiment different from the embodiment shown in FIG. 1A lies in that the pixel electrode PX is formed of a light transmissive conductive film made of ITO (Indium Tin Oxide) or the like and, at the same time, the pixel electrode PX is formed on the same layer as the counter electrode CT.

Due to such a constitution, it is possible to enhance the numerical aperture of the pixels.

In this case, the electric conduction between the pixel electrode PX and the source electrode SD2 of the thin film transistor TFT is achieved by connecting a metal layer S which is pulled out from the source electrode SD2 and the protective film PAS which is formed on the capacitive signal line StL via the through hole.

The connection between the pixel electrode PX and the source electrode SD2 of the thin film transistor TFT via the through hole above the capacitive signal line StL is established to enhance the numerical aperture of the pixels.

Embodiment 4.

Figure 6:
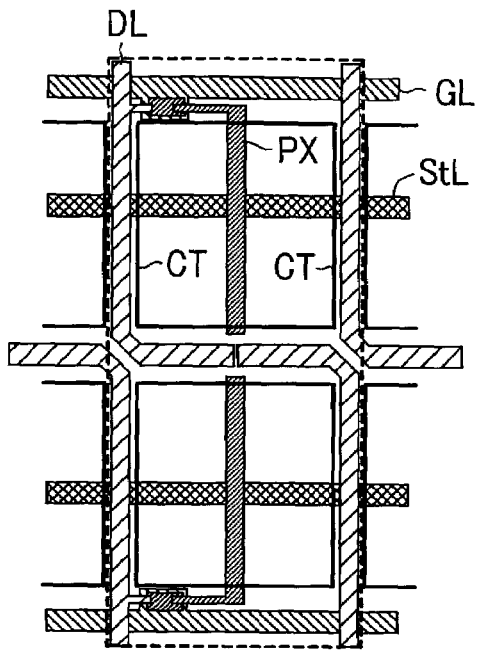
FIG. 6 is a plan view showing another embodiment of a pixel of an image display device according to the present invention.

FIG. 6 is a constitutional view showing another embodiment of the liquid crystal display device according to the present invention and corresponds to FIG. 1A.

The constitution which makes this embodiment different from the embodiment shown in FIG. 1A lies in the constitution of the thin film transistor TFT. That is, the drain electrode SD1 and the source electrode SD2 are respectively arranged on the x line and a channel length and a channel width are determined based on a distance between these electrodes and the widths of these electrodes.

Then, the gate electrode of the thin film transistor TFT is formed by extending a portion of the gate signal line GL into the inside of the pixel region and respective pieces at both sides of the extension portion are arranged substantially parallel to the y direction.

Further, the source electrode SD2 is pulled out from the semiconductor layer AS substantially orthogonal to the respective pieces of the extension portion.

Due to such a constitution, even when a mask is displaced in the vertical direction, for example, at the time of forming the drain signal line DL and the pixel electrode PX, it is possible to maintain an overlapped area of the source electrode SD2 and the gate signal line GL in each thin film transistor TFT at a fixed value and hence, the irregularities of the parasitic capacitance Cgs of each thin film transistor TFT can be suppressed.

Figure 7A:
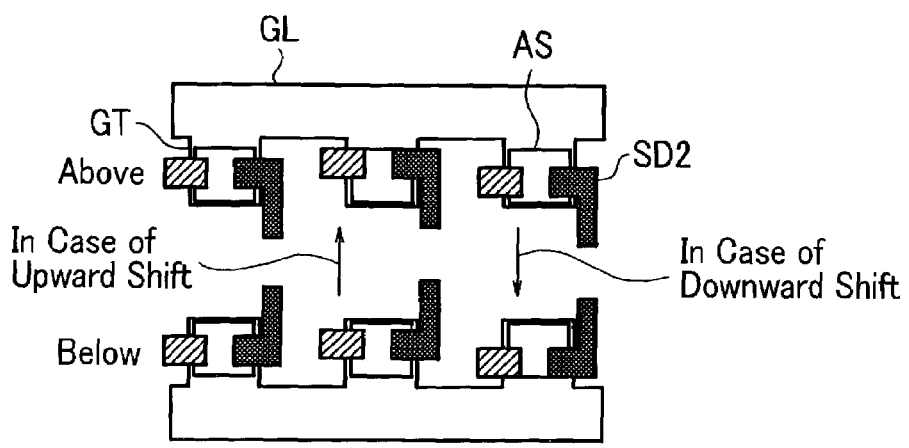
FIG. 7 is an explanatory view exhibiting an advantageous effect of the image display device according to the present invention.

That is, due to such a constitution, as shown in FIG. 7A, even when the source electrode SD2 is displaced in the vertical direction with respect to the gate signal line GL, the overlapped area between the gate electrode GT and the source electrode SD2 can be held unchanged. The same goes for the pixels which are formed in a reversed manner in the vertical direction.

That is, it is possible to prevent the parasitic capacitance Csg from changing discontinuously in the vicinity of the dotted-line-frame shown in FIG. 2 whereby the brightness irregularities are prevented.

Figure 7B:
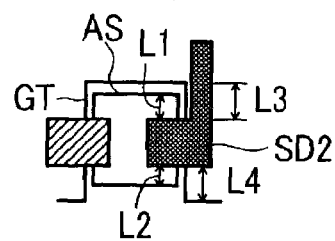

Accordingly, based on the experimental rule on the displacement of the mask at the time of forming the drain signal line DL and the pixel electrode PX, as shown in FIG. 7B, it is desirable to set projection amounts L1, L2 in the y direction of the semiconductor layer AS with respect to the drain electrode SD2 and projection amounts L3, L4 in the y direction of the gate electrode GT with respect to the drain electrode SD2.

Embodiment 5.

Figure 8:
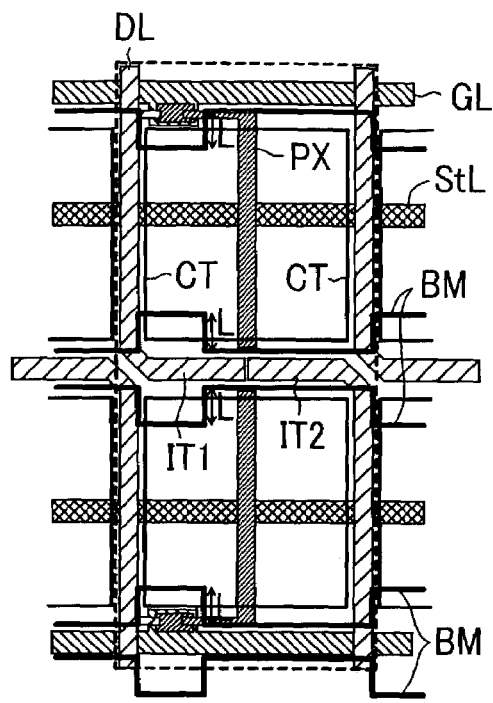
FIG. 8 is a plan view showing another embodiment of the pixel of the image display device according to the present invention.

FIG. 8 is a constitutional view showing another embodiment of the liquid crystal display device according to the present invention and corresponds to FIG. 1A.

The constitution which makes this embodiment different from the embodiment shown in FIG. 1A lies in the constitution of black matrixes (light shielding films) BM.

The black matrixes BM are formed along the respective gate signal lines GL so as to cover the gate signal lines GL. Further, the black matrixes BM are formed so as to also cover the inspection terminals IT1, IT2 which are formed of extension portions provided at one ends of respective drain signal lines DL. The width of the black matrixes BM which cover the respective gate signal lines GL and the width of the black matrixes BM which cover the inspection terminals IT1, IT2 are set to the same width. Due to such a constitution, it is possible to have an advantageous effect that with respect to the liquid crystal display part AR which is structurally divided into two regions, the boundary between respective divided regions cannot be distinguished or recognized.

Further, the black matrixes BM which cover the respective gate signal lines GL include the extension portions which also cover the thin film transistors TFT. Accordingly, also with respect to the black matrixes BM which cover the inspection terminals IT1, IT2, irrespective of the fact that the thin film transistor TFT is not formed in the vicinity of the black matrix BM, the black matrixes BM are formed in the same pattern by setting the relationship L1=L2 in the drawing. This constitution is provided for making the above-mentioned boundary least apparent.

Figure 9:
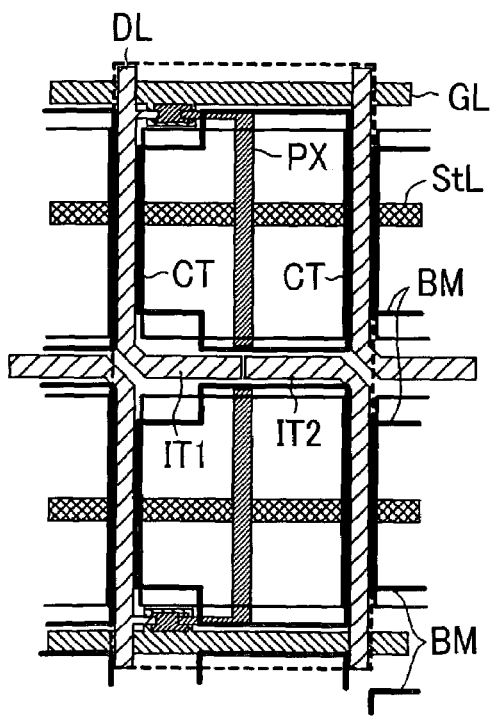
FIG. 9 is a plan view showing another embodiment of the pixel of the image display device according to the present invention.

Due to the same reason, a case shown in FIG. 9 adopts a pattern which also covers the drain signal lines DL with the black matrixes BM. In this case, however, the pattern of the black matrixes which cover the respective gate signal lines GL and the pattern of the black matrixes BM which cover the inspection terminals IT1, IT2 are constituted as the same pattern.

Embodiment 6.

Figure 10A:
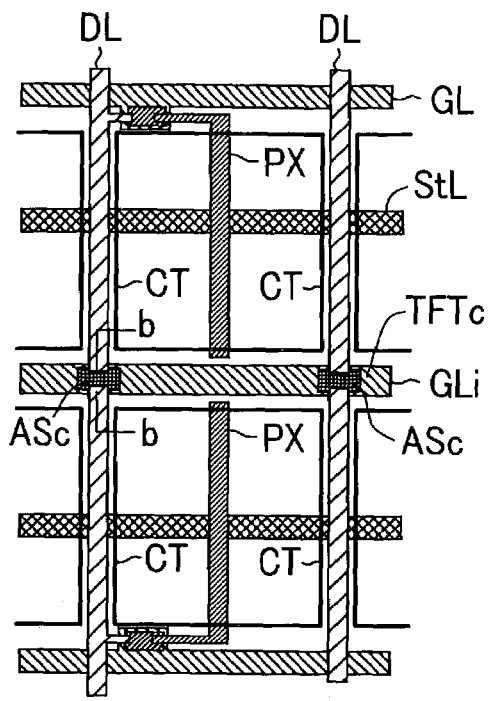
FIG. 10 is a constitutional view showing another embodiment of the image display device according to the present invention.
Figure 10B:
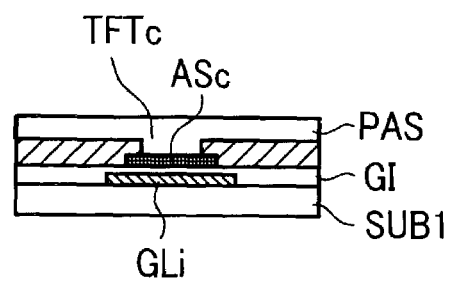

FIG. 10A is a plan view showing one embodiment of the pixel of the liquid crystal display device according to the present invention and corresponds to FIG. 1A. Further, FIG. 10B is a cross-sectional view taken along a line b—b in FIG. 10A.

The constitution which makes this embodiment different from the embodiment shown in FIG. 1A lies in the constitution in which an inspection gate signal line GLi is formed so as to run the separation portion of the respective drain signal lines DL.

A semiconductor layer ASc is formed over an upper surface of the inspection gate signal line GLi by way of an insulation film GI. Above the semiconductor layer ASc, another end of the upper-side drain signal line DL of the liquid crystal display part AR and another end of the lower-side drain signal line DL of the liquid crystal display part AR which are arranged on the same row are arranged to face each other.

That is, the semiconductor layer ASc constitutes a semiconductor layer of the thin film transistor TFTc, wherein when a voltage is applied to the inspection gate signal line GLi, the upper-side and lower-side drain signal lines DL which are arranged in the same row by way of the semiconductor layer ASc are electrically connected to each other.

Here, the thin film transistor TFTc can be formed simultaneously with the thin film transistor TFT of each pixel region.

The inspection terminals are formed in the vicinity of the video signal drive circuit He(1) for the upper-side drain signal lines DL of the liquid crystal display part AR, and the inspection terminals are also formed in the vicinity of the video signal drive circuit He(2) for the lower-side drain signal lines DL of the liquid crystal display part AR. Due to such a constitution, using these respective inspection terminals, it is possible to inspect disconnection or the like of the upper-side and lower-side drain signal lines DL which are electrically connected in the above-mentioned manner.

Figure 10C:
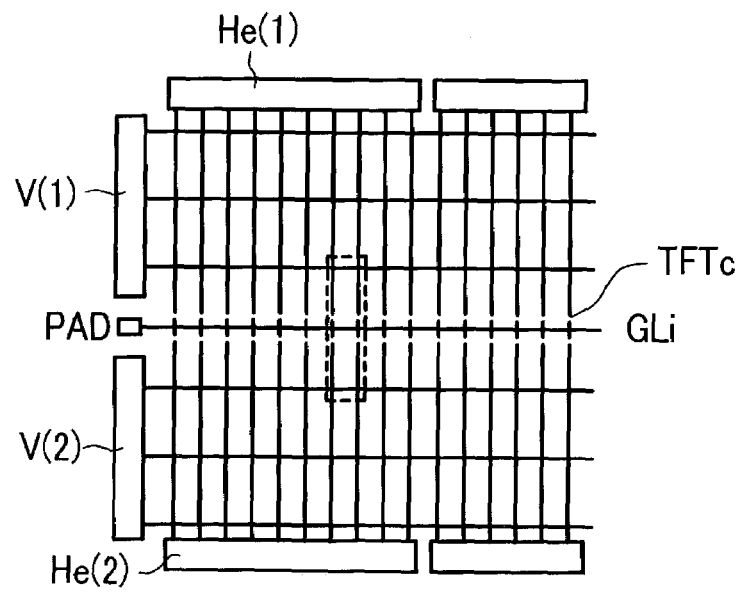

Further, FIG. 10C is a view showing the liquid crystal display part AR of the liquid crystal display device having the above-mentioned pixel and the vicinity thereof.

At one end of the inspection gate signal line GLi which runs in the x direction at the substantially center of the liquid crystal display part AR, an inspection pad PAD is formed. At the time of inspecting the disconnection, a voltage is applied to the inspection pad PAD so as to electrically connect the upper-side and lower-side drain signal lines DL, while the application of the voltage to the inspection pad PAD is released in other time.

Embodiment 7.

Figure 11:
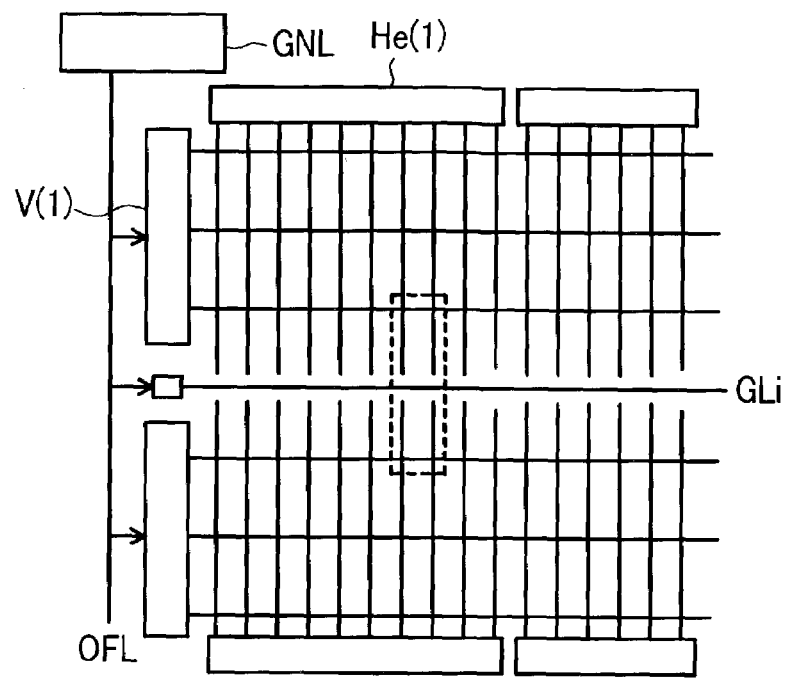
FIG. 11 is a constitutional view showing another embodiment of the image display device according to the present invention.

FIG. 11 is a constitutional view showing another embodiment of the liquid crystal display device according to the present invention and corresponds to FIG. 10C.

The constitution which makes this embodiment different from the embodiment shown in FIG. 10C lies in that in the liquid crystal display device which is completed as a product, the inspection pad PAD of the inspection gate signal line GLi is configured to be connected to an OFF voltage supply line OFL which is served for positively turning off the thin film transistor TFTc driven by the inspection gate signal line GLi.

Further, this OFF voltage supply line OFL is connected to a voltage generation circuit GNR, for example. After inspecting the disconnection or the like of the drain signal lines DL using the inspection gate signal line GLi, it is necessary to electrically separate the upper-side and lower-side drain signal lines DL of the liquid crystal display part AR from each other and hence, in succeeding manufacturing steps, the OFF voltage supply line OFL and the voltage generating circuit GNR are formed.

Embodiment 8.

Figure 12A:
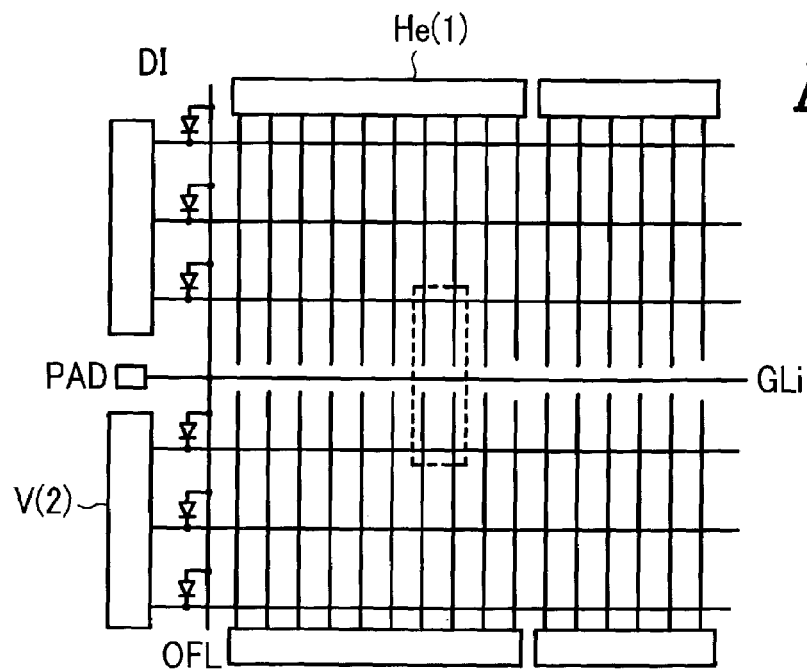
FIG. 12 is a constitutional view showing another embodiment of the image display device according to the present invention.

FIG. 12A is a constitutional view showing another embodiment of the liquid crystal display device according to the present invention and corresponds to FIG. 11.

The constitution which makes this embodiment different from the embodiment shown in FIG. 11 lies in that between the OFF voltage supply line OFL and the respective gate signal lines GL, diodes DI which have cathodes thereof at the OFF voltage supply line OFL side are respectively connected.

In the liquid crystal display device having such a constitution, by applying an ON potential to the inspection pad PAD at the time of inspection, the inspection gate signal line GLi assumes the ON potential.

In this case, although the ON potential is supplied to other gate signal lines GL through the diodes DI, the operation of the gate signal lines GL is irrelevant to the disconnection inspection of the drain signal lines DL and hence, there arises no particular problem.

Further, at the time of operation, only the OFF potential of the gate signal line GL is supplied to the OFF voltage supply line OFL by the diode DI. Accordingly, the stable OFF state is held at the inspection gate signal line GLi.

Figure 12B:
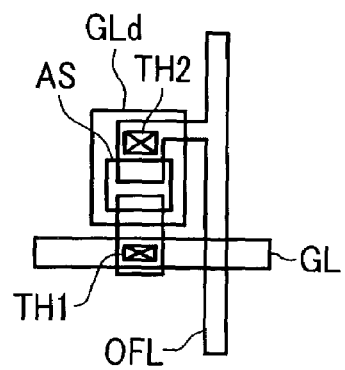

Here, FIG. 12B shows one example of the constitution of the diode DI. In the drawing, TH1, TH2 indicate through holes and GLd indicates an electrode which is formed on the same layer as the gate signal line GL. These respective diodes DI are formed simultaneously with the thin film transistors TFT in the pixel regions, for example, thus obviating the increase of the number of manufacturing steps.

Embodiment 9.

Figure 13:
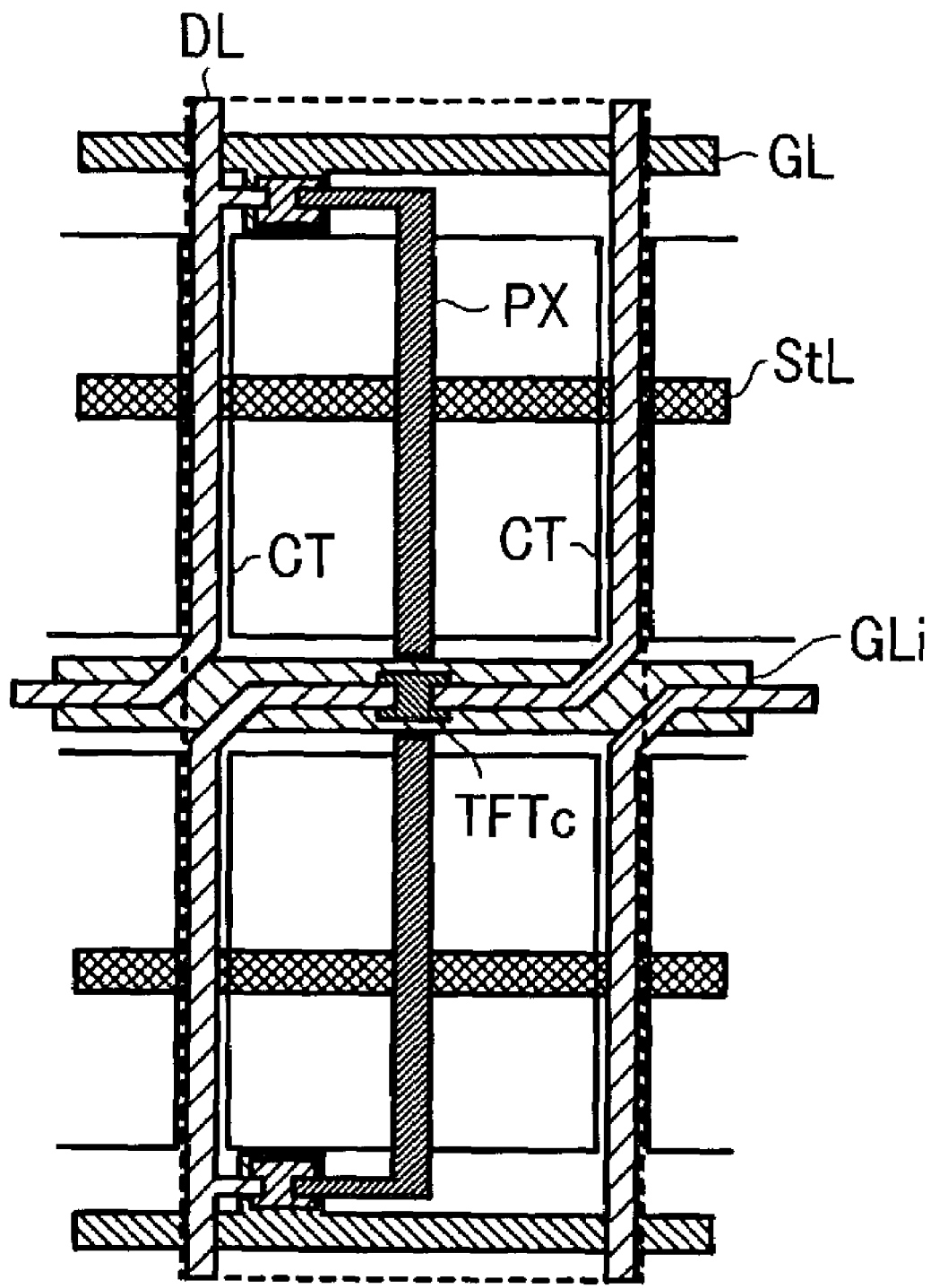
FIG. 13 is a plan view showing another embodiment of the pixel of the image display device according to the present invention.

FIG. 13 is a constitutional view showing another embodiment of the liquid crystal display device according to the present invention and corresponds to FIG. 1A.

The constitution which makes this embodiment different from the embodiment shown in FIG. 1A lies in that the upper-side and lower-side drain signal lines DL in the liquid crystal display part AR are connected to each other through the thin film transistors TFTc driven by the inspection gate signal line GLi.

In this case, one drain signal line DL which is connected using the same thin film transistor TFTc is the drain signal line DL arranged at one side with respect to the pixel and another drain signal line DL which is connected using the same thin film transistor TFTc is the drain signal line DL arranged at another side with respect to the pixel. The liquid crystal display device having such a constitution is particularly effective in dot inversion driving.

That is, when the gate signal lines GL are sequentially selected simultaneously downwardly from the top portion of the liquid crystal display part AR and upwardly from the bottom portion of the liquid crystal display part AR, to write in the upper-side pixel and the lower-side pixel which are arranged closest to each other with reversed polarities from each other, it is necessary to reverse the polarities of the upper-side and lower-side drain signal lines DL from each other.

Accordingly, in the usual operation, the potentials of the reversed polarities are applied to one electrode and another electrode of the thin film transistor TFTc of the inspection gate signal line GLi.

Due to such a constitution, it is possible to reduce the leak current in the thin film transistor TFTc and eventually the reduction of power consumption of the thin film transistor TFTc.

Embodiment 10.

Figure 14:
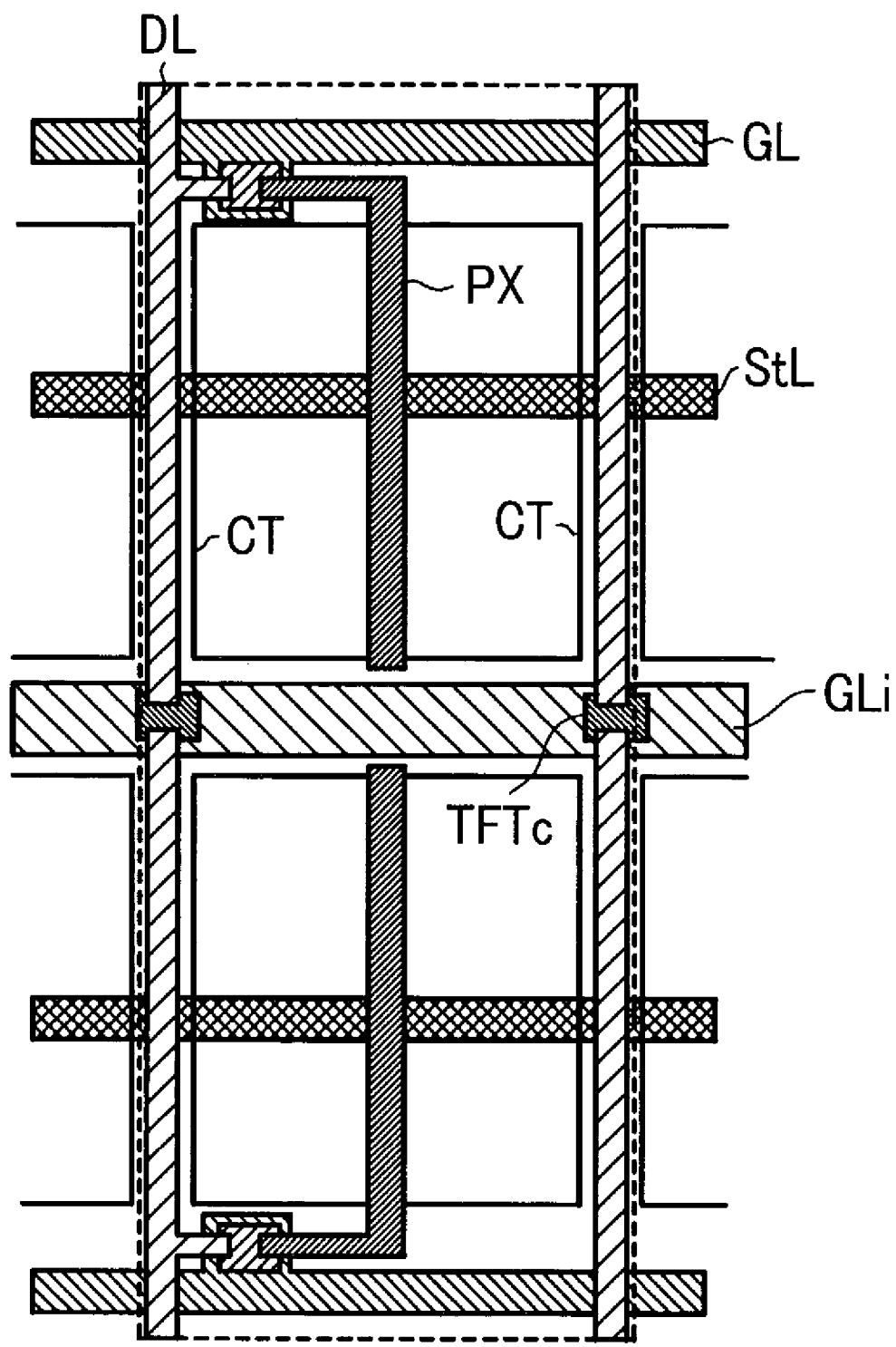
FIG. 14 is a plan view showing another embodiment of the pixel of the image display device according to the present invention.

FIG. 14 is a constitutional view showing another embodiment of the liquid crystal display device according to the present invention and corresponds to FIG. 13.

The constitution which makes this embodiment different from the embodiment shown in FIG. 13 lies in that respective drain signal lines DL which are connected through the thin film transistor TFTc of the inspection gate signal line GLi are constituted of drain signal lines DL which are arranged in the same row.

In this case, for example, first of all, the pixel row which is below the inspection gate signal line GLi by one row is driven. Then, respective pixel rows which are arranged at both sides (outsides) of the pixel row are simultaneously driven. Further, respective pixel rows which are arranged outside the respective pixel rows are simultaneously driven. Further, by performing the so-called dot inversion during the steps, it is possible to obtain advantageous effects similar to the advantageous effects obtained by the embodiment shown in FIG. 13.

Embodiment 11.

Figure 15A:
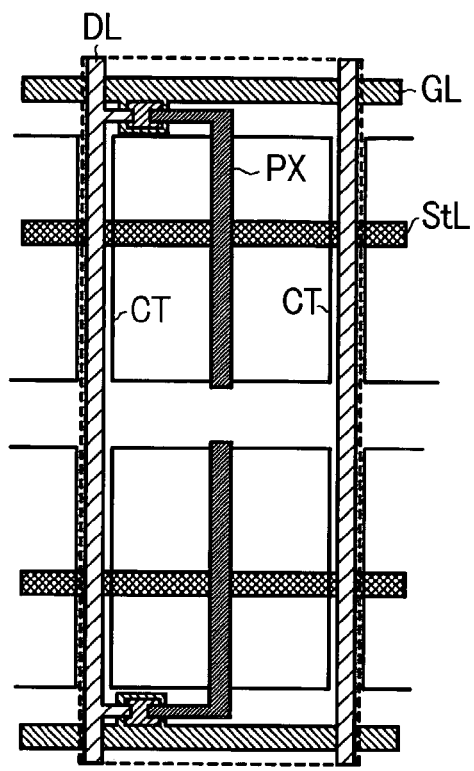
FIG. 15 is a plan view showing another embodiment of the pixel of the image display device according to the present invention.
Figure 15B:
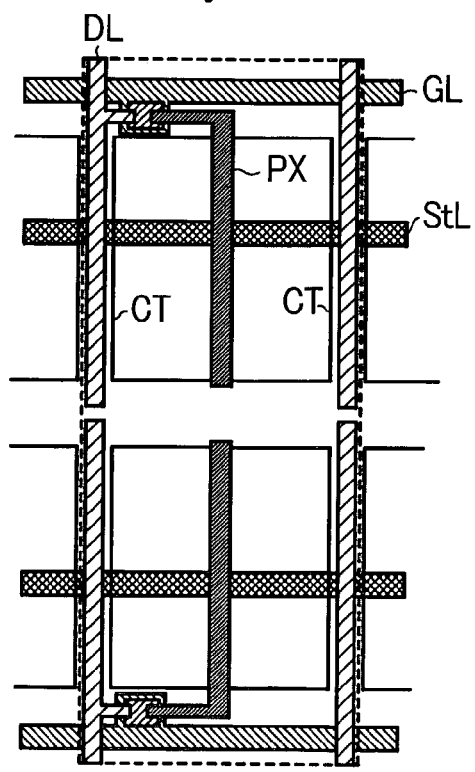

FIG. 15A and FIG. 15B are constitutional views showing another embodiment of the liquid crystal display device according to the present invention, wherein FIG. 15A shows the constitution before inspecting the disconnection of the drain signal line DL or the like and FIG. 15B shows the constitution after inspecting the disconnection of the drain signal line DL or the like. The liquid crystal display device has the same constitution even after completion as the product.

That is, although the drain signal lines DL are originally integrally formed over respective upper-side and lower-side of the liquid crystal display part AR, after the inspection of the disconnection or the like of the drain signal lines DL, it is found that the drain signal lines DL are cut due to scanning or the like with laser beams, for example.

Figure 16A:
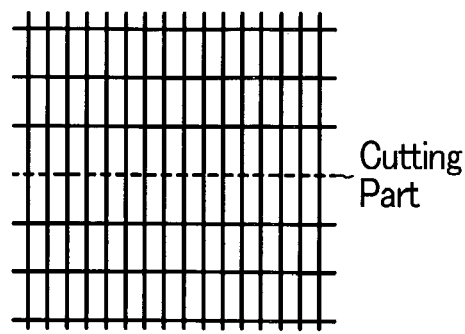
FIG. 16 is a plan view showing another embodiment of the image display device according to the present invention.
Figure 16B:
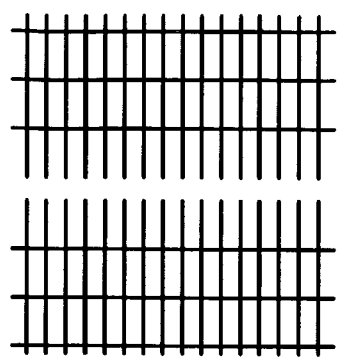

The overall constitution of the liquid crystal display part AR is shown in FIG. 16A which corresponds to FIG. 13A and in FIG. 16B which corresponds to FIG. 13B.

Embodiment 12.

Figure 17:
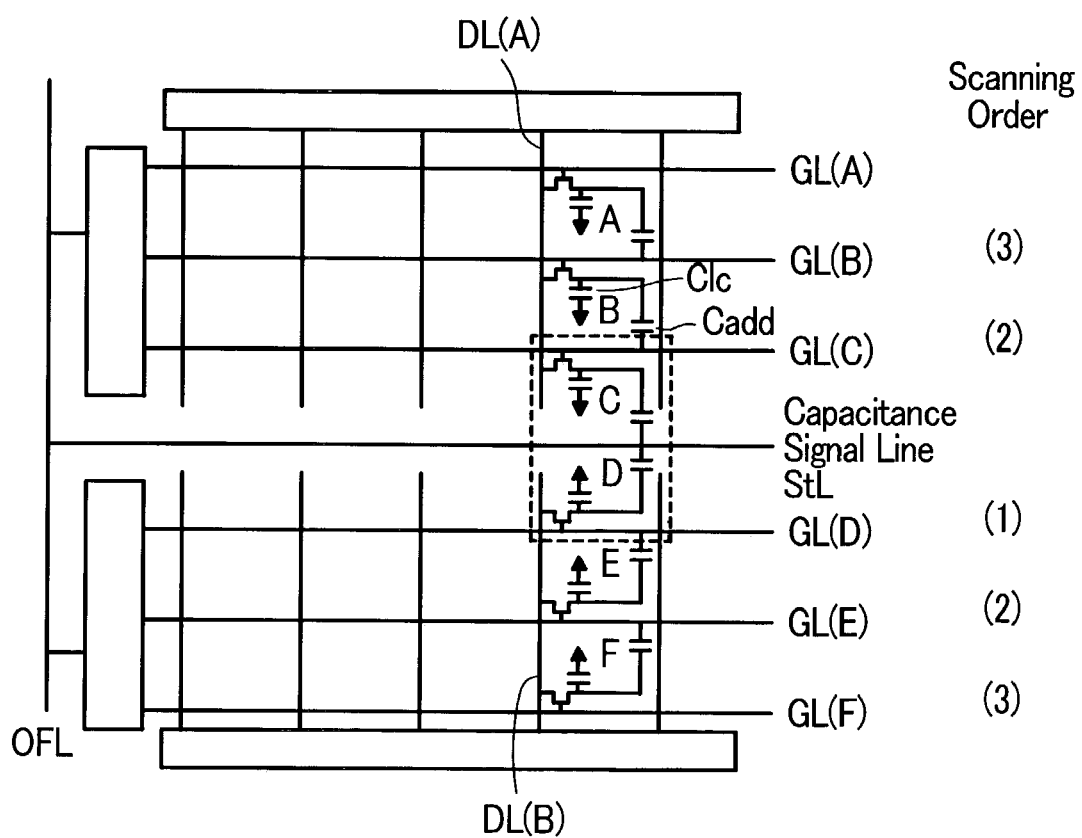
FIG. 17 is a plan view showing another embodiment of the image display device according to the present invention.

FIG. 17 is a constitutional view showing another embodiment of the liquid crystal display device according to the present invention and corresponds to FIG. 11.

The constitution which makes this embodiment different from the embodiment shown in FIG. 11 lies in that the capacitive signal line StL is employed in place of the inspection gate signal line GLi, wherein capacitance is generated between the capacitive signal line StL and the pixel electrodes PX of the pixel rows positioned at both sides of the capacitive signal line StL.

The respective pixels other than the above-mentioned pixels generate capacitive elements Cadd between the respective pixels and the gate signal line GL which differs from the gate signal line GL for driving the pixels and is arranged close to the gate signal line GL for driving the pixels.

In such a constitution, it is known that the capacitive element Cadd can perform the Cgs correction with respect to a large screen and hence, the brightness irregularities in the extension direction of the gate signal lines GL can be reduced.

In view of the above understanding, this embodiment has realized this capacitive element Cadd structure in the above-mentioned screen division method by providing the capacitive signal line StL to the boundary between the upper-side region and the lower-side region of the liquid crystal display part AR.

Then, this embodiment further improves the image quality in the following manner.

That is, as shown in the drawing, when viewed in the longitudinal direction, while the number of capacitive elements Cadd connected to the capacitive signal line StL is two, the number of capacitive element Cadd connected to the gate signal line GL is one. In this manner, the number of capacitive elements differs between the capacitive signal line StL and the gate signal line GL.

Accordingly, in two pixels at the boundary between the upper-side region and the lower-side region (one pixel for each region), compared to other pixels, the stability of the capacitive signal line StL at the time of writing in the thin film transistor TFT is deteriorated so that there arises the displacement with respect to the voltage written in the pixel.

It has been found out that due to such displacement of the voltage, the brightness irregularities in a line shape is generated at the center portion in the lateral direction by an amount of two lines.

Accordingly, respective writing timings of the upper-side region and the lower-side region are shifted at least by one line.

That is, as shown in the drawing, with respect to the scanning sequence, first of all, the pixel row which is arranged below the capacitive signal line StL by one row is driven. Subsequently, respective pixel rows arranged at both sides (outsides) of the pixel row are simultaneously driven.

Further, respective pixel rows which are arranged outside the respective pixel rows are simultaneously driven, and such operations are repeated.

Accordingly, the capacitive signal line StL receives the influence of a jump voltage due to one capacitive element Cadd per a unit time in the same manner as the gate signal line GL and hence, these elements are operated under the same condition so that the brightness irregularities in a line shape can be dissipated. Such a conversion of signals can be easily realized by the controller.

Figure 18:
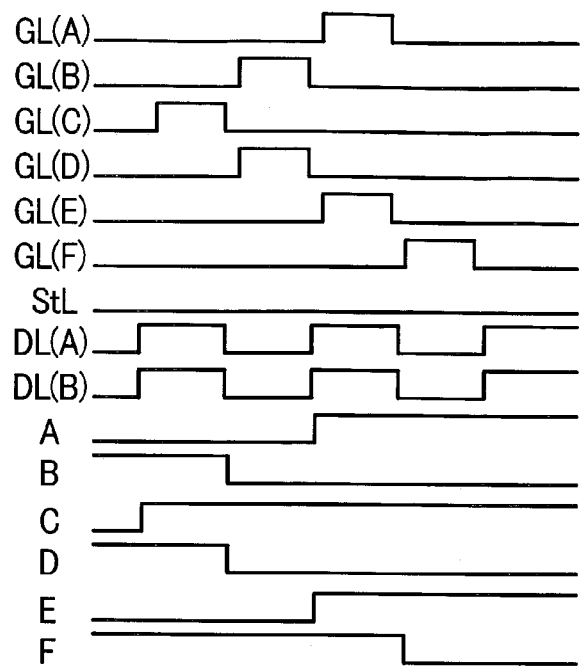
FIG. 18 is an operational timing waveform chart of the image display device shown in FIG. 17.

Here, FIG. 18 shows the above-mentioned scanning operation using scanning signals GL(A) to GL(F) supplied to respective gate signal lines GL and, at the same time, shows the potential state of the capacitive elements (indicated by A to F) which are stored in response to video signals from the drain signal lines D(A), D(B).

Further, due to such operations, even when the drain signal lines DL(A), DL(B) are driven with the same polarity, the polarities of the pixels arranged close to each other are reversed so that the signals can be written whereby, the dot inversion driving can be easily realized.

Embodiment 13.

Figure 19:
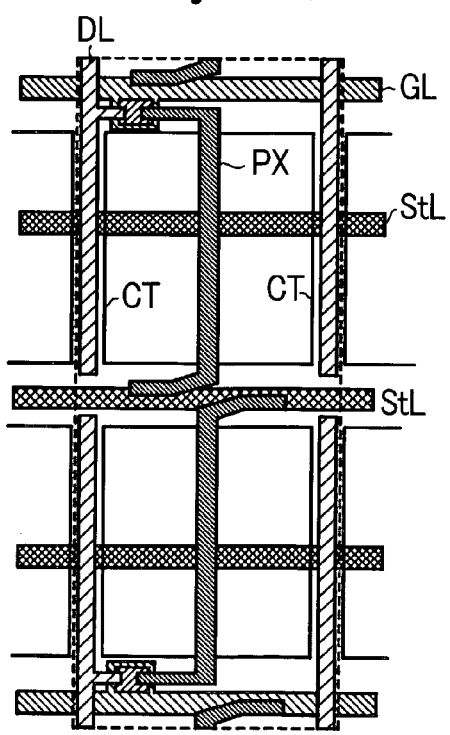
FIG. 19 is a plan view showing another embodiment of the pixel of the image display device according to the present invention.

FIG. 19 is a constitutional view showing another embodiment of the liquid crystal display device according to the present invention and also is a plan view of the pixel which specifically describes the embodiment 12.

The capacitive signal line StL is simultaneously formed at the time of forming the gate signal line GL, for example, while one ends of the pixel electrodes PX of respective pixels which are arranged at both sides of the capacitive signal line StL are respectively overlapped on the capacitive signal line StL.

In this case, to increase the capacitive value of the capacitive element Cadd, one ends of the pixel electrodes PX are bent so as to extend in the longitudinal direction of the capacitive signal line StL.

Embodiment 14.

Figure 20:
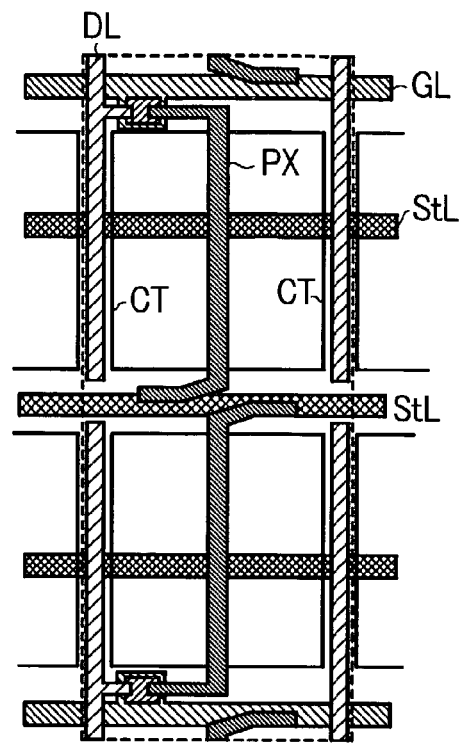
FIG. 20 is a plan view showing another embodiment of the pixel of the image display device according to the present invention.

FIG. 20 is a constitutional view showing another embodiment of the liquid crystal display device according to the present invention and corresponds to FIG. 19.

The constitution which makes this embodiment different from the embodiment shown in FIG. 19 lies in that with respect to the pixels other than the pixels which are positioned at both sides of the capacitive signal line StL, one ends of the pixel electrodes PX are formed so as to extend over the gate signal line GL while directing toward the side opposite to the thin film transistor TFT. This constitution is provided for obviating an electrical contact with the thin film transistor TFT in advance.

Embodiment 15.

Figure 21:
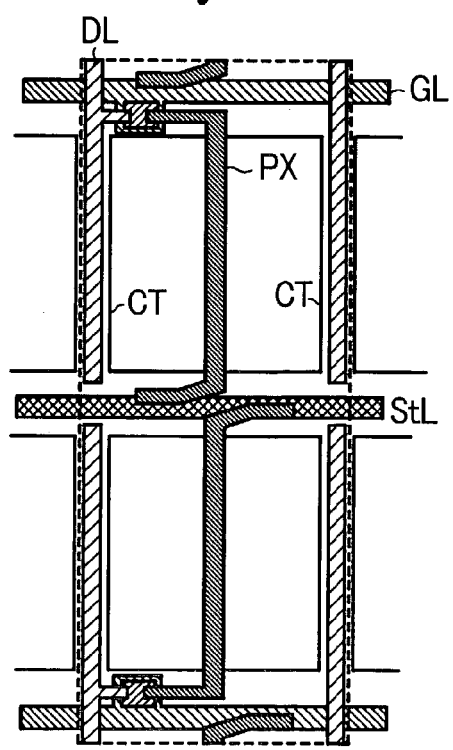
FIG. 21 is a plan view showing another embodiment of the pixel of the image display device according to the present invention.

FIG. 21 is a constitutional view showing another embodiment of the liquid crystal display device according to the present invention and corresponds to FIG. 19.

The constitution which makes this embodiment different from the embodiment shown in FIG. 19 lies in that the capacitive signal line StL is not provided to each pixel region.

Here, in the embodiments 13 to 15, respective drain signal lines DL at the upper-side region and the lower side region of the liquid crystal display part AR are separated from each other. However, it is needless to say that even when the respective drain signal lines DL at the upper-side region and lower-side region are connected to each other through the thin film transistor TFT formed on the capacitive signal line StL, the similar effect is obtained.

Figure 22:
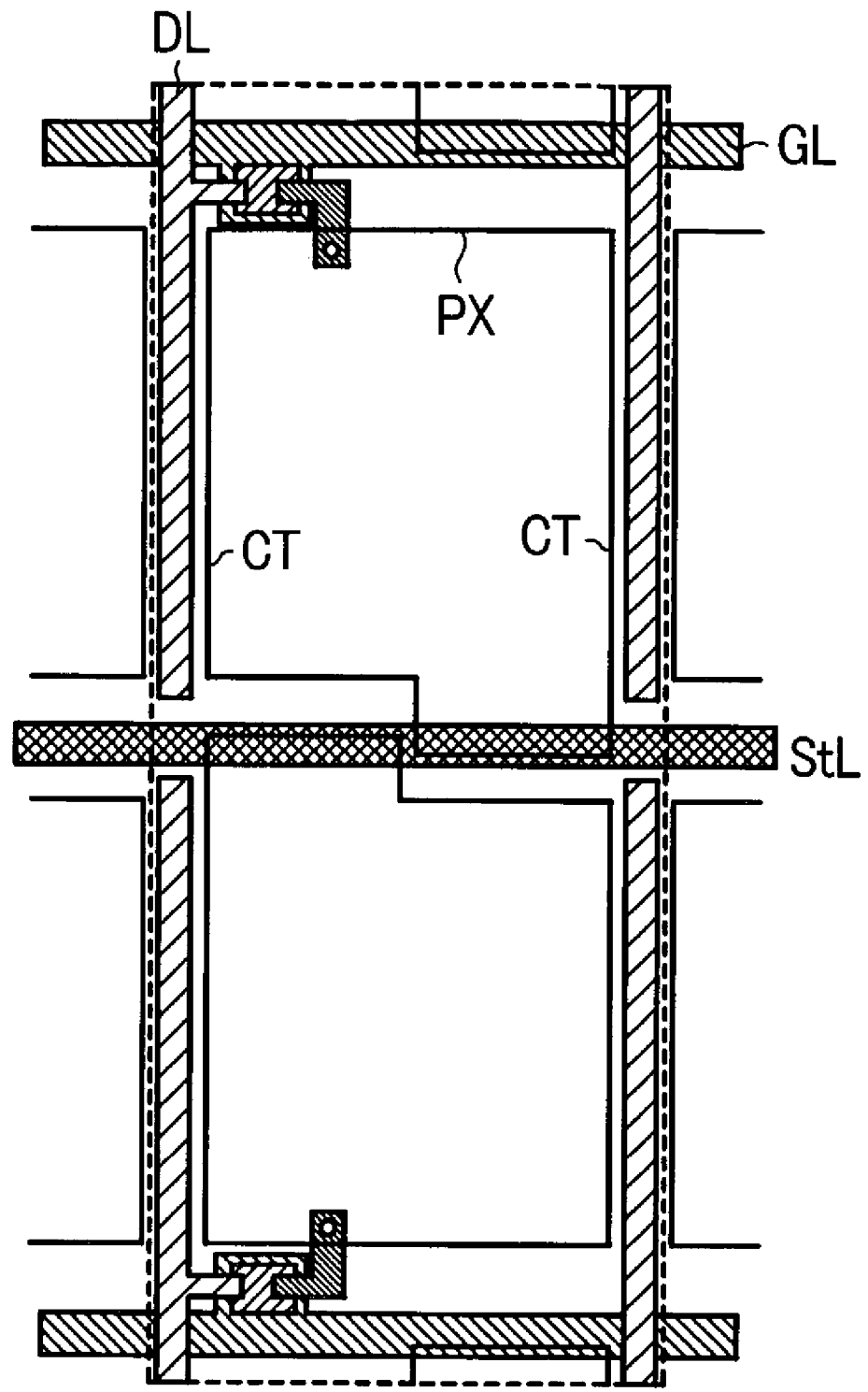
FIG. 22 is a plan view showing another embodiment of the pixel of the image display device according to the present invention.

FIG. 22 is a constitutional view showing another embodiment of the liquid crystal display device according to the present invention, wherein the above-mentioned technical concept is applied to a so-called vertical electric field type liquid crystal display device.

That is, the pixel electrodes PX of the pixels arranged at both sides of the capacitive signal line StL are formed so as to be overlapped to the capacitive signal line StL which is formed between respective drain signal lines DL in the upper-side and lower-side regions of the liquid crystal display part AR.

Although the above-mentioned image display device is explained in conjunction with the liquid crystal display device, for example, it is needless to say that the present invention is applicable to other image display device such as the organic EL (Electro Luminescence) or the like.

As can be clearly understood from the foregoing explanation, according to the image display device of the present invention, it is possible to obtain the sufficient writing time of the video signals for one line whereby the display of high definition or the display of fast animation image can be realized.

The invention claimed is:

1. An image display device wherein
on a pixel-forming-side surface of one substrate,
a plurality of drain signal lines extend in a first direction,
a plurality of gate signal lines extend in a second direction and intersect said plurality of drain signal lines to define pixels,
said plurality of drain signal lines are divided into a group of upper drain signal lines and a group of lower signal lines which end portions are separated from each other at approximately center portions of the pixels,
upper video signals are supplied to said upper drain signal lines from a first video signal drive circuit,
lower video signals are supplied to said drain signal lines from a second video signal drive circuit, and
end portions of said upper drain signal lines and end portions of said lower drain signal lines extend along the second direction towards each other and constitute inspection terminals.

2. An image display device according to claim 1, wherein portions where the inspection terminals are formed are protected from light by light shielding films which have an identical shape and an identical size as light shielding films formed on portions where respective gate signal lines are formed.

3. An image display device wherein
a plurality of drain signal lines extended in a first direction on a substrate,
a plurality of gate signal lines extended in a second direction and intersected said plurality of drain signal lines to define pixels,
each of the pixels includes a thin film transistor and a pixel electrode,
said plurality of drain signal lines are divided into a group of upper drain sinnal lines and a group of lower signal lines which end portions are separated from each other at approximately center portions of the pixels,
upper video signals are supplied to said upper drain signal lines from a first video sianal drive circuit,
lower video signals are supplied to said drain signal lines from a second video signal drive circuit,
a thin film transistor in a respective pixel, which transmits the upper video signal of one respective upper drain signal line, is operated in response to a scanning signal from a respective gate signal line arranged at a upper side with respect to the pixel, and a thin film transistor in a respective pixel, which transmits the lower video signal of one respective lower drain signal line is operated in response to a scanning signal from a respective gate signal line arranged at a lower side with respect to the pixel.

4. An image display device according to claim 3, wherein each said thin film transistor includes a first electrode which is connected to said drain signal line and a second electrode which is connected to said pixel electrode, and a channel direction of said thin film translator which is set by the arrangement of the first electrode and the second electrode is arranged substantially parallel to a respective gate signal line.

5. An image display device wherein on a pixel-forming-side surface of one substrate, a plurality of drain signal lines in a first direction, a plurality of gate signal lines extended in a second direction and intersected said plurality of drain signal lines to define pixels, said plurality of drain signal lines are divided into a group of upper drain signal lines and a group of lower signal lines which end portions are connected to each other through a respective switching element, end portions of said upper drain signal lines and end portions of said lower drain signal lines extend along the second direction towards each other and overlap with a semiconductor layer of said respective switching element.

video signals from a first video signal drive circuit are supplied to said upper drain signal lines, video signals from a second video signal drive circuit are supplied to said lower drain signal lines, said respective switching elements are connected to an inspection gate signal line in common, and said inspection gate signal line is connected to a voltage generating circuit which supplies an OFF voltage.

6. An image display device wherein on a pixel-forming-side surface of one substrate, a plurality of drain signal lines extended in a first direction, a plurality of gate signal lines extended in a second direction and intersected said plurality of drain signal lines to define pixels, said plurality of drain signal lines are divided into a group of upper drain signal lines and a group of lower signal lines which end portions are connected to each other at approximately center portions of the pixels through a respective switching element, end portions of said upper drain sianal lines and end portions of said lower drain signal lines extend along the second direction towards each other and overlap with a semiconductor layer of said respective switching element, video signals from a first video signal drive circuit are supplied to said upper drain signal lines, video signals from a second video signal drive circuit are supplied to said lower drain signal lines, said respective switching elements are connected to an inspection gate signal line in common, and said inspection gate signal line is connected to said respective gate signal lines through diodes which use inspection gate signal line sides thereof as cathodes.

* * * * *